United States Patent [19]
Moore et al.

[11] Patent Number: 4,772,085
[45] Date of Patent: * Sep. 20, 1988

[54] MULTIMODE FIBER OPTIC COUPLER AND METHOD FOR MAKING

[75] Inventors: Douglas R. Moore, Buffalo Grove; Darrell L. Wuensch, Streamwood, both of Ill.

[73] Assignee: Gould Inc., Rolling Meadows, Ill.

[*] Notice: The portion of the term of this patent subsequent to Dec. 30, 2003 has been disclaimed.

[21] Appl. No.: 923,985

[22] Filed: Oct. 28, 1986

[51] Int. Cl.$^4$ .............................................. G02B 6/26
[52] U.S. Cl. ............................ 350/96.15; 350/96.16
[58] Field of Search .......................... 350/96.15, 96.16

[56] References Cited

U.S. PATENT DOCUMENTS

| | | |
|---|---|---|
| 4,054,366 | 10/1977 | Barnoski et al. |
| 4,291,940 | 9/1981 | Kawasaki et al. ............... 350/96.15 |
| 4,330,170 | 5/1982 | Johnson et al. ................... 350/96.16 |
| 4,449,781 | 5/1984 | Lightstone et al. .......... 350/96.16 X |
| 4,490,163 | 12/1984 | Jochem et al. ................. 350/96.15 X |
| 4,586,784 | 5/1986 | Tremblay et al. ................ 350/96.15 |
| 4,601,541 | 7/1986 | Shaw et al. .................... 350/96.15 X |
| 4,632,513 | 12/1986 | Stowe et al. ................. 350/96.15 X |

Primary Examiner—Paul Gensler
Attorney, Agent, or Firm—Robert J. Fox; G. Paul Edgell; Edward E. Sachs

[57] ABSTRACT

A multimode fiber optic coupler includes a first multimode optical fiber having a core and cladding surrounding the core and having a first longitudinal segment in which the cladding has been substantially removed exposing the core and in which a portion of the exposed core forms a first biconical taper segment; a second multimode optical fiber having a core and a cladding surrounding the core and having a second longitudinal segment in which the cladding has been substantially removed exposing the core and in which a portion of the exposed core forms a second biconical taper segment; and a coupling region formed by portions of the first and second biconical taper segments being fused together in parallel juxtaposition with one another.

8 Claims, 7 Drawing Sheets

Fig. 1a: POWER TRANSMITTED VS. LENGTH OF TAPER FOR CORNING 50/125 MULTIMODE FIBER (NO ETCHING)

Fig. 1b: POWER TRANSMITTED VS LENGTH OF TAPER FOR CORNING 50/125 MULTIMODE FIBER (WITH ETCHING OF CLADDING TO 57μm)

Fig. 2a: POWER TRANSMITTED VS LENGTH OF TAPER FOR SPECTRAN 62.5/125 MULTIMODE FIBER (NO ETCHING)

Fig. 2b: POWER TRANSMITTED VS LENGTH OF TAPER FOR SPECTRAN 62.5/125 MULTIMODE FIBER. (FIBER ETCHED TO 58μm)

Fig. 3:

PRIMARY AND COUPLED POWER VS TAPER LENGTH DURING FABRICATION OF MULTIMODE COUPLER USING CORNING 50/125 FIBER (NO ETCHING)

MULTIMODE FIBER OPTIC COUPLER AND METHOD FOR MAKING

BACKGROUND OF THE INVENTION

This invention is directed to fiber optic couplers and in particular to couplers for multimode optical fibers and a method of producing these couplers.

Multimode optical fiber transmits optical energy in more than one optical mode. Various methods have been used to produce multimode optical couplers. The simplest method involves cleaving two optical fibers normal to the longitudinal axis and aligning them end to end with a third fiber to form a "Y" coupler. Disadvantages of the Y type coupler include the fact that the fibers must be carefully cleaved at the proper angle; alignment of the fibers is critical and often difficult to achieve and these couplers generally exhibit large excess losses. Another method of forming a multimode coupler involves etching away the cladding layers of two multimode fibers. The etched fibers are then twisted together to achieve evanescent wave coupling. Long coupling regions are required to obtain significant coupling of optical energy from one fiber to the other.

U.S. Pat. No. 4,291,940 to Kawasaki et al. describes a fused biconical taper coupler. This coupler is fabricated by forming biconical taper sections in two portions of two multimode fibers, twisting the fibers together and then heating a region of the tapered section to fuse them together. Problems with this method include the fact that twisting of the fibers often causes increased excess loss. It is also more difficult to achieve consistent tapers from one coupler to another. And in this particular coupler typical losses range from one to two decibels.

Twisting the fibers together has two major drawbacks: (1) the twist tends to induce microbend loss in the fibers and increases the excess loss of the coupler; (2) the inventors' experience has shown that the twist also tends to make the taper process more difficult to control. In the twisted region the fibers are in contact over a very short length and this may cause the tapers to be too steep. If the tapers are too steep or sharp, the loss resulting from the tapering process can become severe. The inventors have also observed that the twist can move along the fiber lengths if the tension in the fibers is not balanced. If the twisted region moves away from the center of the heat source during fusion or is simply located off-center, the resulting taper profile changes. Hence, unless the twist is carefully done, it can be a troublesome source of inconsistent and nonreproducible tapers.

Therefore it is an object of the present invention to provide a multimode coupler having losses of the order of less than one decibel.

It is another object of the invention to provide a method of making a multimode coupler which is simple and reproducible and can produce couplers having stable performance characteristics.

It is yet another object of the present invention to provide a reproducible method of making low loss fused multimode fiber couplers.

Additional objects, advantages and novel features of the invention will be set forth in part in the description which follows and in part will become apparent to those skilled in the art upon examination of the following or may be learned by practice of the invention.

SUMMARY OF THE INVENTION

To achieve the foregoing and other objects and in accordance with purposes of the present invention, a multimode fiber optic coupler may comprise a first multimode optical fiber having a core and a cladding surrounding the core and having a first longitudinal segment in which the cladding has been substantially removed exposing the core and in which a portion of the exposed core forms a first biconical taper segment; a second multimode optical fiber having a core and a cladding surrounding the core and having a second longitudinal segment in which the cladding has been substantially removed exposing the core and in which a portion of the exposed core forms a second biconical taper segment; and a coupling region formed by portions of the first and second biconical taper segments fused together substantially in parallel juxtaposition with one another.

A method of making a multimode fiber optic coupler may comprise the steps of (a) providing first and second multimode optical fibers, the first and second optical fibers each having a core surrounded by a cladding; (b) removing substantially all of the cladding to expose the core along a first longitudinal segment of the first optical fiber; (c) removing substantially all of the cladding to expose the core along a second longitudinal segment of the second optical fiber; (d) maintaining the first and second optical fibers in parallel juxtaposition with one another along a portion of the first and second longitudinal segments; and (e) fusing and tapering together the portion of the first and second longitudinal segments maintained in parallel juxtaposition to form a coupling region.

BRIEF DESCRIPTION OF THE DRAWINGS

The foregoing invention is illustrated in the accompanying drawings wherein.

DESCRIPTION OF THE PREFERRED EMBODIMENTS

Figure 7:
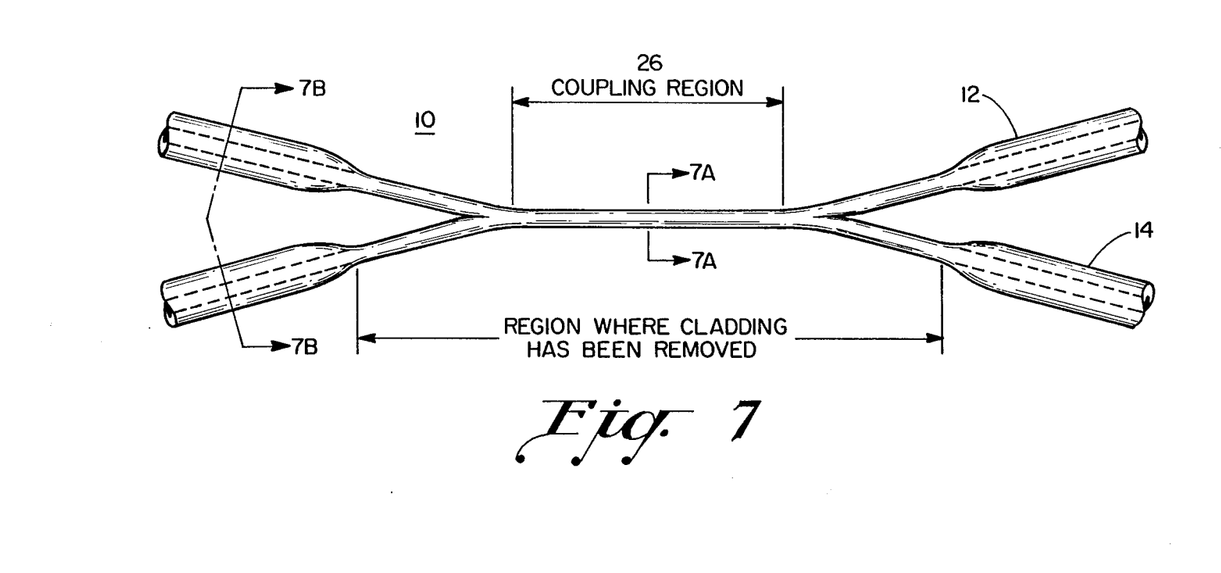
FIGS. 7, 7A, 7B are schematic representations of a multimode coupler according to the present invention.
Figure 7A:
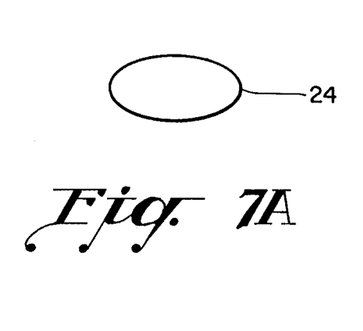
Figure 7B:
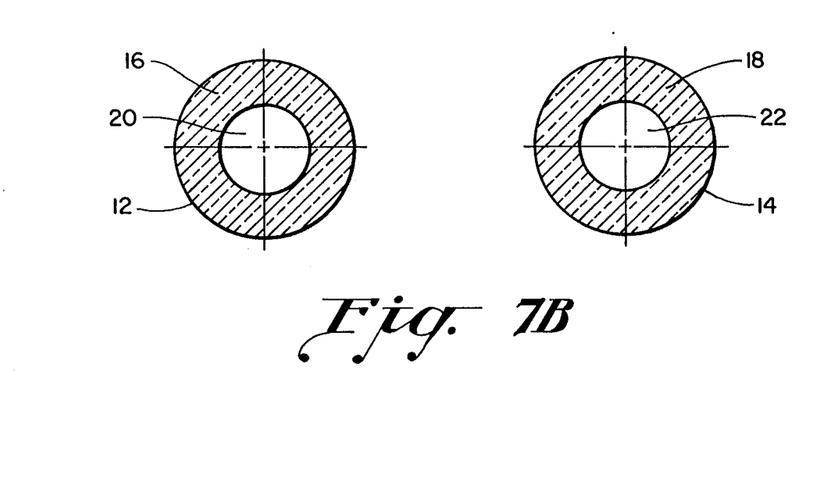

A multimode fiber optic coupler according to the present invention is shown in FIG. 7. The multimode coupler 10 is shown formed of multimode fibers 12 and 14. In FIG. 7b the cross-sections of fibers 12 and 14 are shown in which fiber 12 has cladding 16 and core 20 and fiber 14 has cladding 18 and core 22. In the coupling region 26 it can be seen that the cladding has been removed from each of fibers 12 and 14 to leave only the two cores which have been fused and tapered together. In FIG. 7a is shown a cross-section of the coupling region in which the two cores have been fused together by heating and tapering to form a coupling region in which the cross-section perpendicular to the longitudinal section is substantially oval in shape. The coupling region has been formed by placing and maintaining the two longitudinal segments of the multimode fibers in substantially parallel juxtaposition during the fusing step.

The method of making a multimode coupler according to the present invention incorporates some of the process steps in co-assigned U.S. Pat. No. 4,632,513, for 'Method of Making A Polarization-Insensitive, Evanescent-Wave, Fused Coupler With Minimal Environmental Sensitivity'.

Two multimode fibers are cleaned and mounted onto movable platforms such as the ones described in U.S. Pat. No. 4,632,513. The multimode fibers are then chemically etched. Unlike the single mode fibers, the multimode fibers are etched down to or very close to the core diameter. In other words, substantially all or most of the cladding of the fibers is removed by the etchant. The etched sections of fiber then consist of the fiber core surrounded by a cladding consisting predominately of the surrounding air. The reasons for removing all or most of the fiber cladding are discussed below. Alternatively, the multimode fibers may be polished to remove the cladding.

Once the fibers are etched, they are placed in parallel juxtaposition to one another and in contact with one another. Preferably the tying method developed for the single mode fiber couplers are described in U.S. Pat. No. 4,632,513. The pair of multimode fibers is then fused and tapered with a flame and moving platforms until the desired coupling ratio is achieved (usually 50%) and a coupling region is formed along the etched portions. The coupler may then be packaged in a manner similar to that used for single mode couplers as described in Ser. No. 705,044.

When the fibers are heated with the flame, a flame temperature much hotter than that used for single mode fibers is required. The inventors' experience has shown that the hotter flame temperature is necessary to achieve a coupling ration of 50% without simultaneously inducing high excess loss. This requirement is particularly important for multimode fibers with large core sizes (e.g. 62.5 microns and 100 microns in diameter). Preferably, a flame having a temperature very near that of the softening point of the glass fiber (1500°–1700° C.) should be used.

Figure 1A:
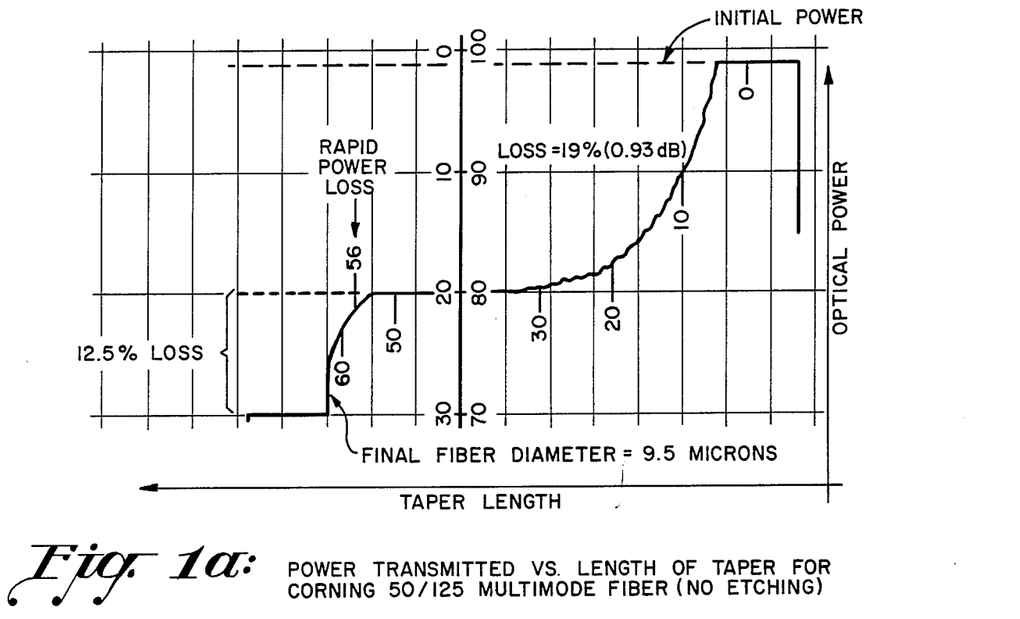
FIG. 1a is a graph of power transmitted versus length of taper for a single Corning 50/125 multimode fiber that has not been etched.
Figure 1B:
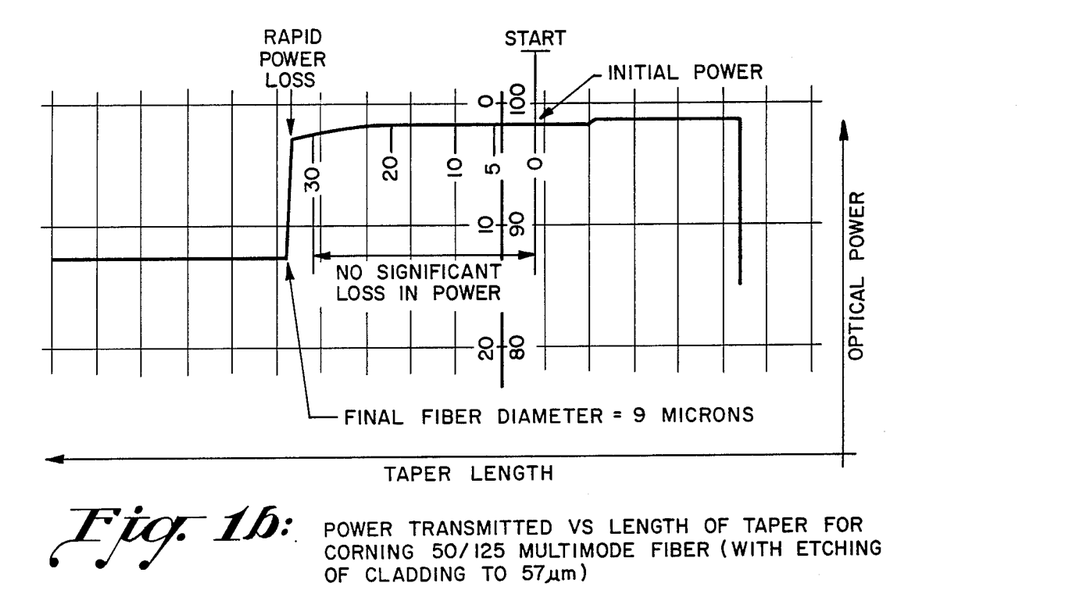
FIG. 1b is a graph of power transmitted versus length of taper for a single Corning 50/125 multimode fiber in which the fiber has been etched to an overall diameter of 57 microns.
Figure 2A:
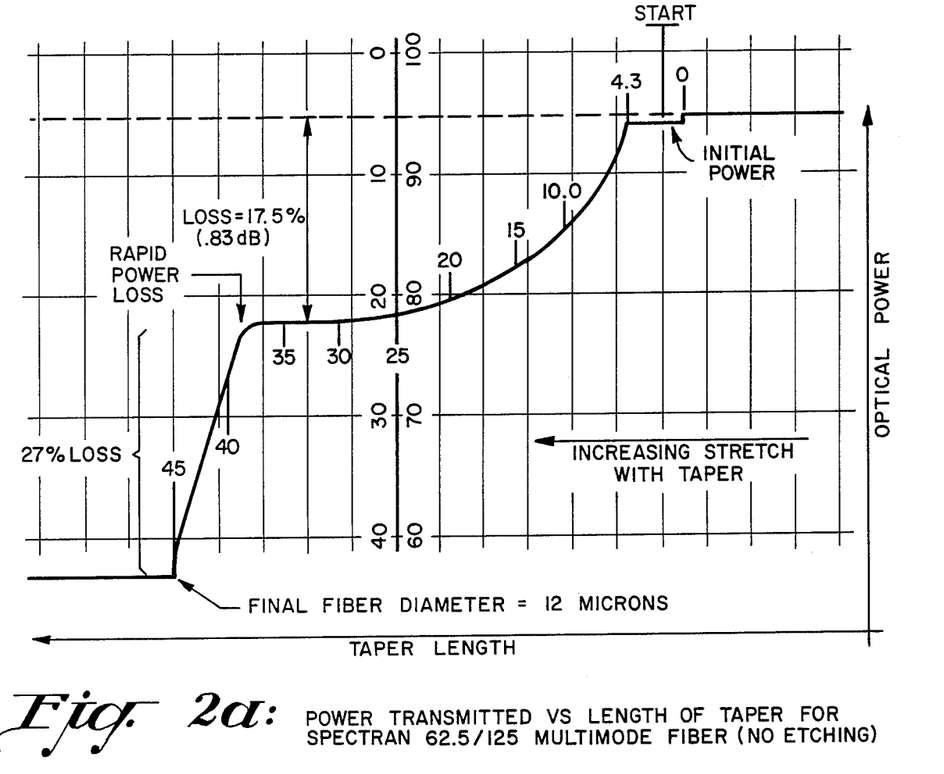
FIG. 2a is a graph of power transmitted versus length of taper for a single Spectran 62.5/125 multimode fiber that has not been etched.

Most of the fused multimode couplers made by others are fused and tapered with the original fiber cladding layer left intact and undisturbed. These couplers offer simplicity, less fabrication time and lower manufacturing costs since no attempts are made to remove any of the cladding prior to fusing the fibers. The inventors have shown, however, that the typical excess loss of such couplers (1–1.5 dB) can be reduced and minimized by removing all or most of the fiber cladding prior to fusing the fibers. This statement is supported, in part, by the experimental data shown in FIGS. 1 and 2. Individual lengths of multimode fiber were heated in a flame and slowly tapered in a manner identical to that described in the method of fabrication of single-mode fused couplers disclosed in U.S. Pat. No. 4,632,513. The optical power transmitted through the fiber was monitored on a chart recorder throughout the heating and tapering procedures. The experiment was performed on fibers for which all or most of the cladding layer had been removed via chemical etching as well as for fully cladded fibers as received from the manufacturer. The fibers used in the experiments were Corning 50/125 (50 micron core diameter, 125 micron cladding diameter) and Spectran 62.5/125 (62.5 micron core diameter and 125 micron cladding diameter) multimode fiber. FIGS. 1a and 2a show the optical power transmitted through the fully cladded fibers as they were heated and tapered. Both the 50/125 and 62.5/125 fibers began to exhibit loss as soon as the tapering process began. The loss continued to grow with increasing stretch until the fibers had been stretched approximately 5 mm (each side). At that point the loss through the biconical tapered region of the fibers was 19% and 17.5% for the Corning 50/125 and Spectran 62.5/125 fibers, respectively. The loss then remained constant for additional stretching until the fiber diameters become quite small. When the loss began to increase again the tapering process was stopped and the diameters of the fibers were measured in the center of the biconical taper section. The final diameters of the 50/125 and 62.5/125 fibers were 9.5 microns and 12 microns, respectively.

Figure 2B:
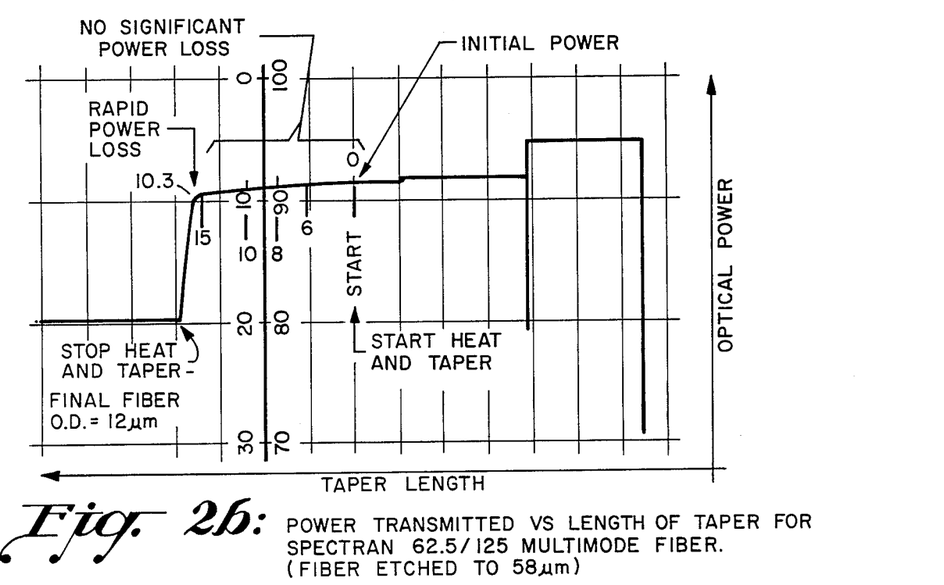
FIG. 2b is a graph of power transmsitted versus length of taper for a single Spectran 62.5/125 multimode fiber in which the fiber has been etched to an overall diameter of 58 microns.

The same experiment was performed with the fiber claddings etched away. The diameter of the Corning 50/125 fiber after etching was 57 microns. The diameter of the Spectran 62.5/125 fiber after etching was 58 microns. As shown in FIGS. 1b and 2b neither etched fiber exhibited any initial loss when the tapering began. In fact, no significant loss was observed until the fibers were tapered to a very small size. At this point the tapering process was stopped and the diameters of the fibers measured at the center of the biconical taper section were 9 microns and 12 microns for the Corning 50/125 and Spectran 62.5/125 fibers, respectively. Thus, the data clearly shows that the initial loss suffered at the beginning of the tapering process can be avoided by first removing the optical cladding of the fiber.

The optical loss observed in the tapering process is attributed to the excitation of cladding modes or radiation modes in the downward taper that are not reconverted to core-guided modes in the upward taper. From the previous discussion it is clear that the removal of all or most of the fiber cladding prior to tapering eliminates the loss encountered in the early stage of the taper process and permits the fibers to be substantially tapered before any significant loss is observed. Consider the following explanation: The number of modes a step-index multimode fiber can support is given approximately by $$N = \tfrac{1}{2}(V^2), \tag{1}$$

where V is the normalized frequency of the fiber and can be written as $$V = \frac{2\pi}{\lambda} r(n_{core}^2 - n_{cladding}^2)^{\frac{1}{2}}, \quad (2)$$

$\lambda$ = wavelength of the light,
r = fiber core radius,
$n_{core}$ = refractive index of fiber core,
$n_{cladding}$ = refractive index of fiber cladding The quantity $(n^2_{core} - n^2_{cladding})^{\frac{1}{2}}$ is commonly called the numerical aperture (N.A.) of the fiber.

For the Corning 50/125 fiber r=25 microns and N.A.=0.21.

For the Spectran 62.5/125 fiber r=31.25 microns and N.A.=0.29.

In both cases $n_{core}$167 1.458.

Inspection of equations (1) and (2) shows that the modal capacity of the fiber, i.e. the number of core-guided modes it can support, is directly proportional to the square of the core radius and the numerical aperture. If the diameter of a fully cladded multimode fiber is reduced by tapering, (as in FIGS. 1a and 2a) the modal capacity of the fiber decreases resulting in an optical loss caused by the excitation of cladding modes or radiation modes that are not recaptured by the fiber core in the upward taper. However, when the cladding layer is removed over a section of the fiber, the exposed fiber segment becomes air-clad ($n_{cladding} = n_{air} = 1$) and has an increased numerical aperture. In this case the etched fiber sections have a greater modal capacity than the unetched fiber and can be tapered without loss until the diameter of the air-clad fiber section is reduced to the point that it can no longer support the modal population present in the unetched fiber. (See FIGS. 1b and 2b).

When the optical fiber is substantially tapered, the optical fields associated with the modes within the fiber core extend out well beyond the core/cladding interface of the fiber. The effect of the original fiber cladding then becomes less and less significant and the fiber may be treated as an air-clad composite waveguide having a core that consists of the original fiber core and cladding. In this situation the tapered unetched fiber behaves in a manner similar to the etched fiber in that the air cladding permits the fiber to be tapered further without inducing any additional loss. See FIGS. 1a and 2a. In both cases, however, a critical fiber diameter is eventually reached at which point the modal capacity of the air-clad, tapered fiber section equals that of the normal fiber. If the fiber diameter is decreased below this critical value, the reduced modal capacity of the tapered section causes light to be radiated out of the fiber and lost. By using equations (1) and (2) with $n_{cladding} = n_{air} = 1$ the critical fiber radius, $r_c$, can be expressed as $$r_c = \left[ \frac{2N}{(n^2_{core} - 1)} \right]^{\frac{1}{2}} \cdot \frac{\lambda}{2\pi}, \quad (3)$$

where N is the original number of modes in the fiber with the cladding layer fully intact. For the Corning 50/125 fibers, N=809 modes and $r_c$=4.95 microns. For the Spectran 62.5/125 fiber N=2411 modes and $r_c$=8.54 microns.

Thus, when the diameters of the Corning and Spectran fibers are tapered to approximately 10 microns and 17 mircons, respectively, the fibers should become lossy. These results compare quite favorably with the final fiber diameters measured in FIGS. 1 and 2.

Figure 3:
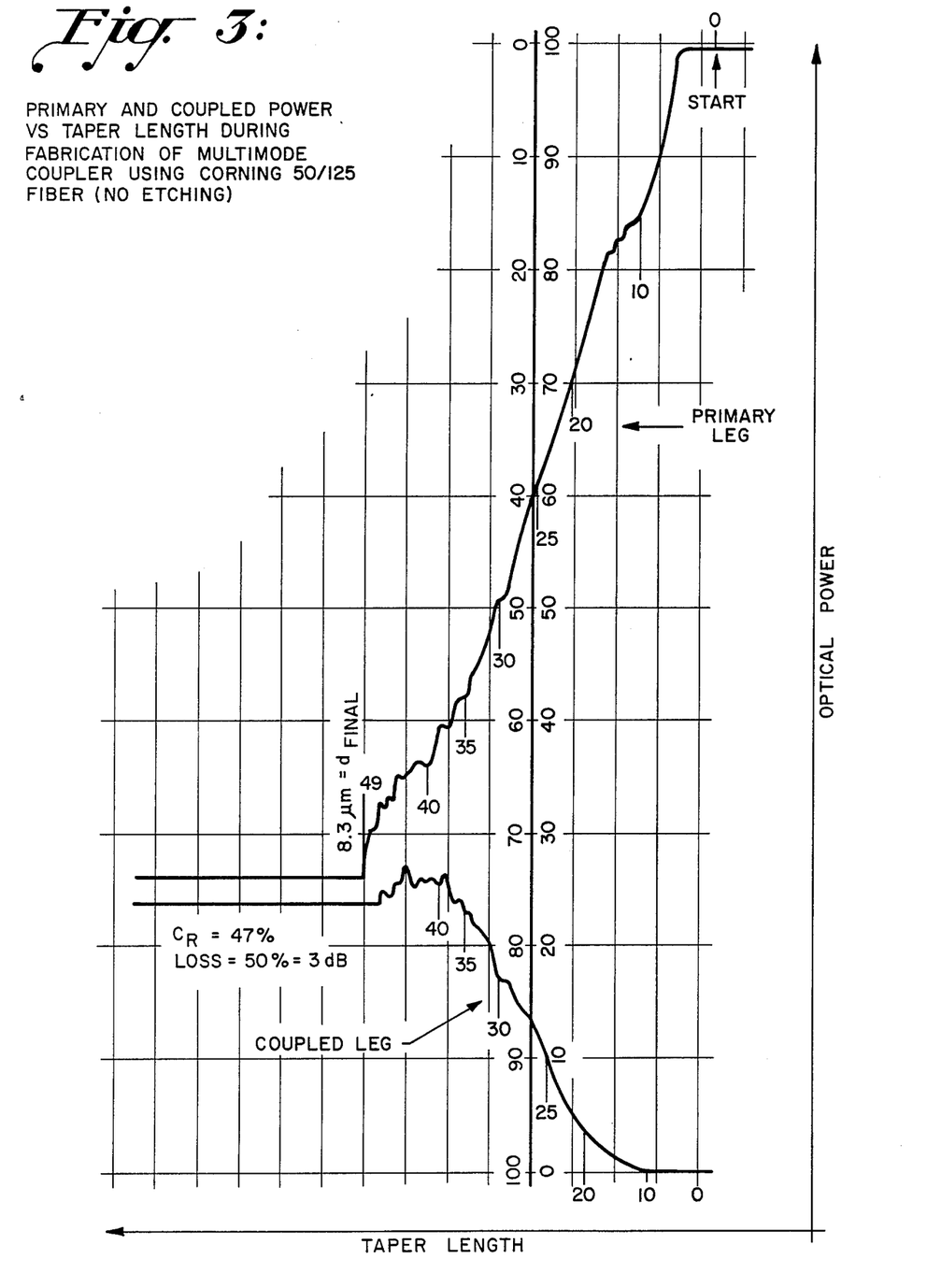
FIG. 3 is a graph of primary and coupled powers versus taper length during fabrication of a multimode coupler using two Corning 50/125 fibers which have not been etched.
Figure 4:
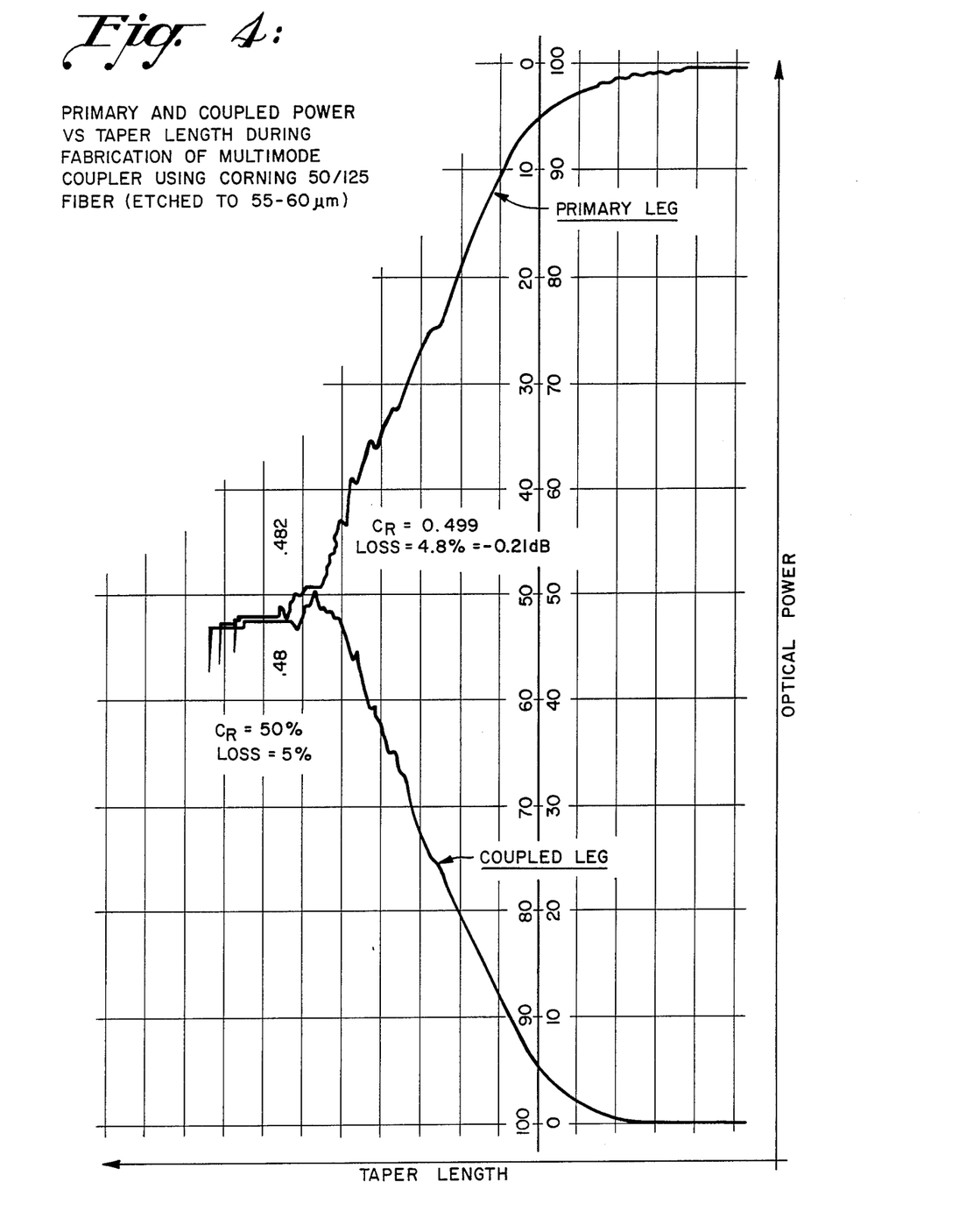
FIG. 4 is a graph of primary and coupled powers versus taper length during fabrication of a multimode coupler using two Corning 50/125 fibers which have been etched to between 55 and 60 microns.

The effect of the cladding layer on the amount of excess loss induced during the coupler fabrication process is clearly seen in FIGS. 3 and 4. In FIG. 3, the result of an attempt to make a coupler without first removing any of the cladding layer is shown. An excess loss of 50% (3 dB) was experienced at a coupling ratio of 47%. Note that loss was immediately encountered when the tapering process began. This is consistent with the results obtained for a single unetched fiber (See FIG. 1a). However, as shown in FIG. 4, when most of the cladding was etched away (O.D. of etched fiber=55-60 microns), a 50% coupling ratio can be achieved with very little excess loss (5% loss).

Figure 5:
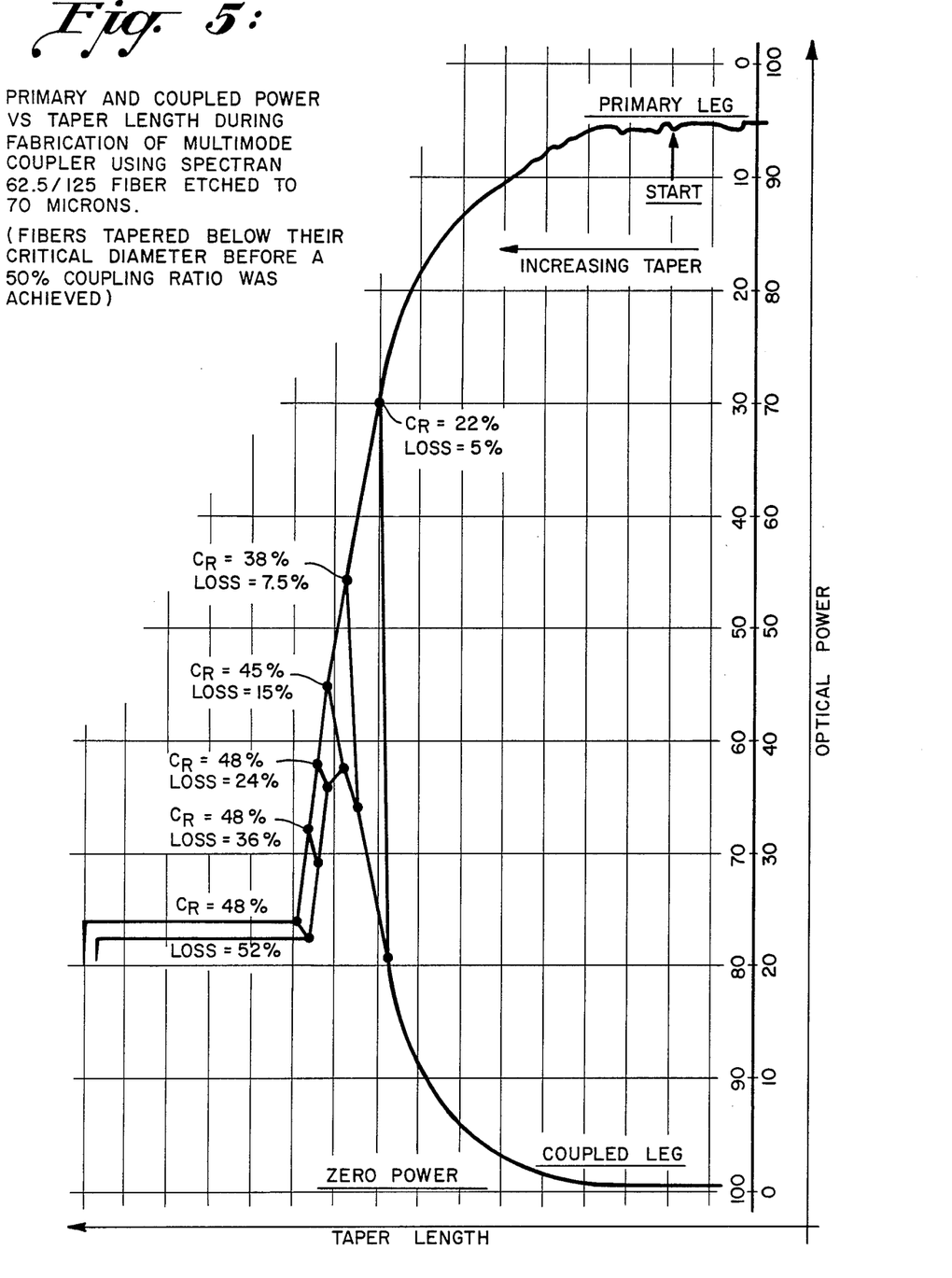
FIG. 5 is a graph of primary and coupled powers versus taper length during fabrication of a multimode coupler using two Spectran 62.5/125 fibers which have been etched to 70 microns.
Figure 6:
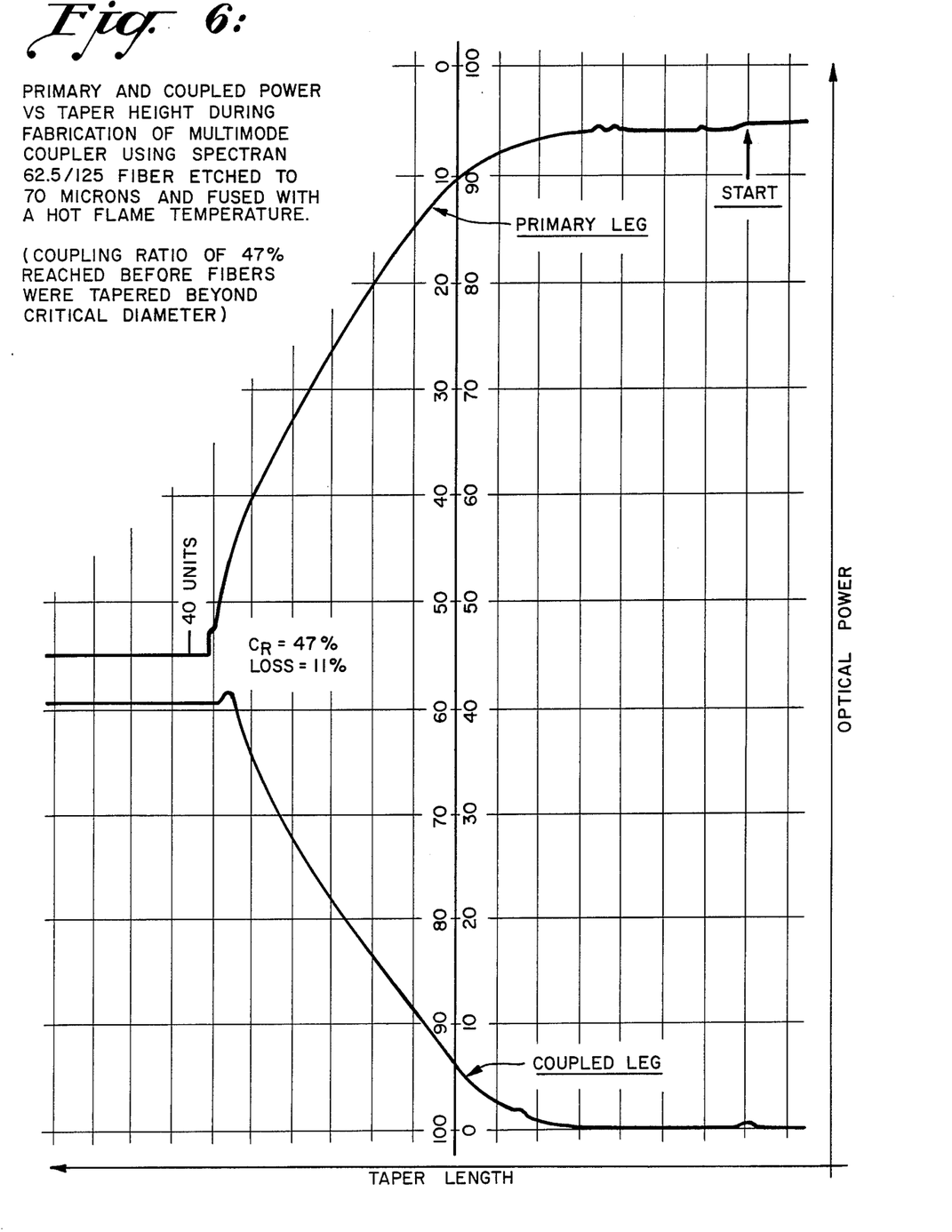
FIG. 6 is a graph of primary and coupled powers versus taper length during fabrication of a multimode coupler using two Spectran 62.5/125 fibers which have been etched to 70 microns and fused with a hotter flame.

During the development of the multimode coupler process it became clear that a flame temperature much hotter than that used for single mode couplers was necessary to fabricate low loss multimode fused couplers. There are two main reasons for this. The multimode fibers typically have a larger diameter, even after etching, than the etched single mode fibers. Since the cross-sectional area of the fibers is larger, heat is conducted out of the flame region faster. Hence, more heat must be applied to achieve the temperature needed to fuse the fibers. The hotter flame also tends to yield a greater coalescence of the two fibers, resulting in an oval shaped cross-section of the coupling region rather than a figure-eight or dumb bell shaped one. This greater degree of fusion brings the two core centers closer together and decreases the amount of tapering needed to achieve a specific coupling ratio. In particular, it was found that with cooler flame settings, the fibers were often tapered below their critical diameter before 50% coupling could be achieved. This behavior is shown in FIG. 5, where the loss in a coupler was observed to increase quickly once the coupling ratio reached 40%. A coupling ratio of near 50% (i.e. 48.5%) was finally achieved but at the expense of an unacceptable 52% loss. On the other hand, as shown in FIG. 6, a coupling ratio of about 50% can be achieved with very low values of excess loss provided the flame temperature is hot enough.

We claim:
1. A multimode fiber optic coupler, comprising:
a first multimode optical fiber having a first core and a first cladding surrounding the first core and having a first longitudinal segment in which the first cladding has been substantially removed exposing the first core and in which a portion of the exposed first core forms a first biconical taper segment;
a second multimode optical fiber having a second core and a second cladding surrounding the second core and having a second longitudinal segment in which the second cladding has been substantially removed exposing the second core and in which a portion of the exposed second core forms a second biconical taper segment; and
a coupling region formed by a portion of the first biconical taper segment and a portion of the second biconical taper segment fused together in parallel juxtaposition with one another.

2. A multimode fiber optic coupler as defined in claim 1, wherein the coupling region has a substantially oval cross-section perpendicular to the first longitudinal segment and the second longitudinal segment.

3. A method of making a multimode fiber optic coupler, comprising the steps of:
   providing a first multimode optical fiber and a second multimode otpical fiber, the first multimode optical fiber having a first core surronded by a first cladding, the second multimode optical fiber having a second core surrounded by a second cladding;
   removing substantially all of the first cladding to expose the first core along a first longitudinal segment of the first multimode optical fiber;
   removing substantially all of the second cladding to expose the second core along a second longitudinal segment of the second multimode optical fiber;
   maintaining the first multimode optical fiber and the second multimode optical fiber in parallel juxtaposition with one another along a portion of the first longitudinal segment and the second longitudinal segment; and
   tapering and fusing together the portion of the first longitudinal segment and the portion of the second longitudinal segment maintained in parallel juxtaposition to form a coupling region.

4. A method of making a multimode fiber optic coupler as defined in claim 3, wherein the second cladding is removed from the second core of the second longitudinal segment of the second multimode optical fiber by etching.

5. A method of making a multimode fiber optic coupler as defined in claim 3, wherein the second cladding is removed from the second core of the second longitudinal segment of the second multimode optical fiber by polishing.

6. A method of making a multimode fiber optic coupler as defined in claim 4, by tapering and fusing together the first longitudinal segment and the second longitudinal segment in parallel juxtaposition, further comprising the steps of:
   maintaining the first multimode optical fiber and the second multimode optical fiber under axial tension; and
   heating with a heat source the portion of the first longitudinal segment and the portion of the second longitudinal segment while the first longitudinal segment and the second longitudinal segment are maintained in parallel juxtaposition and remain under axial tension.

7. A method of making a multimode fiber optic coupler as defined in claim 3, wherein the portion of the first longitudinal segment and the portion of the second longitudinal segment are fused together so that the coupling region so formed has a substantially oval cross-section perpendicular to the first longitudinal segment and the second longitudinal segment.

8. A method of making a multimode fiber optic coupler, comprising the steps of:
   providing a first multimode optical fiber comprising a first core;
   providing a second multimode optical fiber comprising a second core;
   decreasing an index of refraction of a first medium in proximity with the first core;
   decreasing an index of refraction of a second medium in proximity with the second core;
   orienting the first core and the second core in parallel juxtaposition with one another;
   reducing a diameter of a portion of the first core to produce a first reduced diameter portion;
   reducing a diameter of a portion of the second core to produce a second reduced diameter portion; and
   fusing together the first reduced diameter portion and the second reduced diameter portion to form a coupling region.

* * * * *